US011801687B2

(12) United States Patent
Hauf et al.

(10) Patent No.: US 11,801,687 B2
(45) Date of Patent: Oct. 31, 2023

(54) EJECTION CONTROL USING IMAGER

(71) Applicant: Kateeva, Inc., Newark, CA (US)

(72) Inventors: Christopher R. Hauf, Belmont, CA (US); David Darrow, Pleasanton, CA (US); David Donovan, Newark, CA (US)

(73) Assignee: Kateeva, Inc., Newark, CA (US)

( * ) Notice: Subject to any disclaimer, the term of this patent is extended or adjusted under 35 U.S.C. 154(b) by 0 days.

(21) Appl. No.: 17/446,700

(22) Filed: Sep. 1, 2021

(65) Prior Publication Data

US 2021/0394528 A1 Dec. 23, 2021

Related U.S. Application Data

(63) Continuation of application No. 16/682,389, filed on Nov. 13, 2019, now Pat. No. 11,135,854.

(60) Provisional application No. 62/775,955, filed on Dec. 6, 2018.

(51) Int. Cl.
  *B41J 2/21* (2006.01)
  *H04N 1/00* (2006.01)
(52) U.S. Cl.
  CPC ........ *B41J 2/2135* (2013.01); *H04N 1/00761* (2013.01)
(58) Field of Classification Search
  CPC .................................................... B41J 2/2135
  See application file for complete search history.

(56) References Cited

U.S. PATENT DOCUMENTS

| 8,908,075 | B2 | 12/2014 | Silverbrook |
| 9,081,519 | B2 | 7/2015 | Moreau et al. |
| 9,259,931 | B2 | 2/2016 | Moreau et al. |
| 2008/0068420 | A1 | 3/2008 | Yanagisawa et al. |
| 2009/0267975 | A1 | 10/2009 | White et al. |
| 2013/0021412 | A1* | 1/2013 | Nishimura ........... B41J 2/14201 347/68 |
| 2015/0298153 | A1 | 10/2015 | Baker et al. |
| 2016/0146463 | A1 | 5/2016 | Kiyama et al. |
| 2018/0229497 | A1* | 8/2018 | Darrow .................. B41J 2/2135 |

FOREIGN PATENT DOCUMENTS

| CN | 104772981 A | 7/2015 |
| EP | 3028969 A1 | 6/2016 |
| JP | 2004025736 A | 1/2004 |

(Continued)

OTHER PUBLICATIONS

Final Office Action dated Mar. 31, 2021 to U.S. Appl. No. 16/682,389.

(Continued)

*Primary Examiner* — Jason S Uhlenhake
(74) *Attorney, Agent, or Firm* — Hauptman Ham, LLP

(57) ABSTRACT

A printing system includes a substrate support, a printhead assembly positioned facing the substrate support, and an imager. The printhead assembly includes a plurality of dispensing nozzles extending in an ejection direction towards the substrate support and a plurality of marks. The imager is movable relative to the printhead assembly and oriented in a direction opposite to the ejection direction for capturing at least one image including the plurality of marks indicating positions of the plurality of dispensing nozzles in the printhead assembly.

20 Claims, 9 Drawing Sheets

(56) References Cited

FOREIGN PATENT DOCUMENTS

| | | |
|---|---|---|
| JP | 2004066771 A | 3/2004 |
| JP | 2007313717 A | 12/2007 |
| JP | 2013237005 A | 11/2013 |
| JP | 2015229314 A | 12/2015 |
| TW | 201509691 A | 3/2015 |
| TW | 201808464 A | 3/2018 |
| TW | 201840442 A | 11/2018 |
| WO | 2016146463 A1 | 9/2016 |

OTHER PUBLICATIONS

Non Final Office Action dated Oct. 28, 2020 to U.S. Appl. No. 16/682,389.
Notice of Allowance dated Jul. 6, 2021 for U.S. Appl. No. 16/682,389.
Office Action dated Dec. 24, 2021 for KR Patent Application No. 10-2021-7020250.
Notification of Transmittal of the International Search Report and Written Opinion of the International Searching Authority, dated Feb. 3, 2020, for International Application No. PCT/US2019/061943.
JP Notice of Reason for Refusal dated Jan. 7, 2022 for Application No. 2021-531345.
Examination Report dated Dec. 5, 2022 for TW Patent Application No. 108141389.
Supplemental Search Report dated Aug. 2, 2022 in EP Patent Application No. 19893261.8.

* cited by examiner

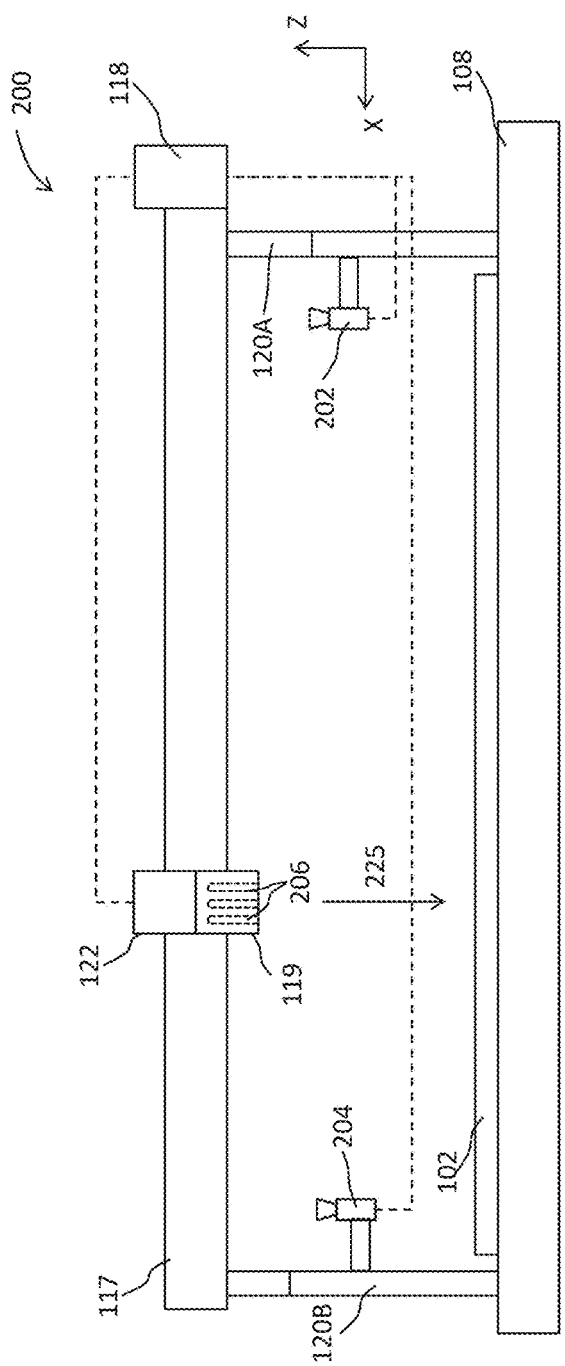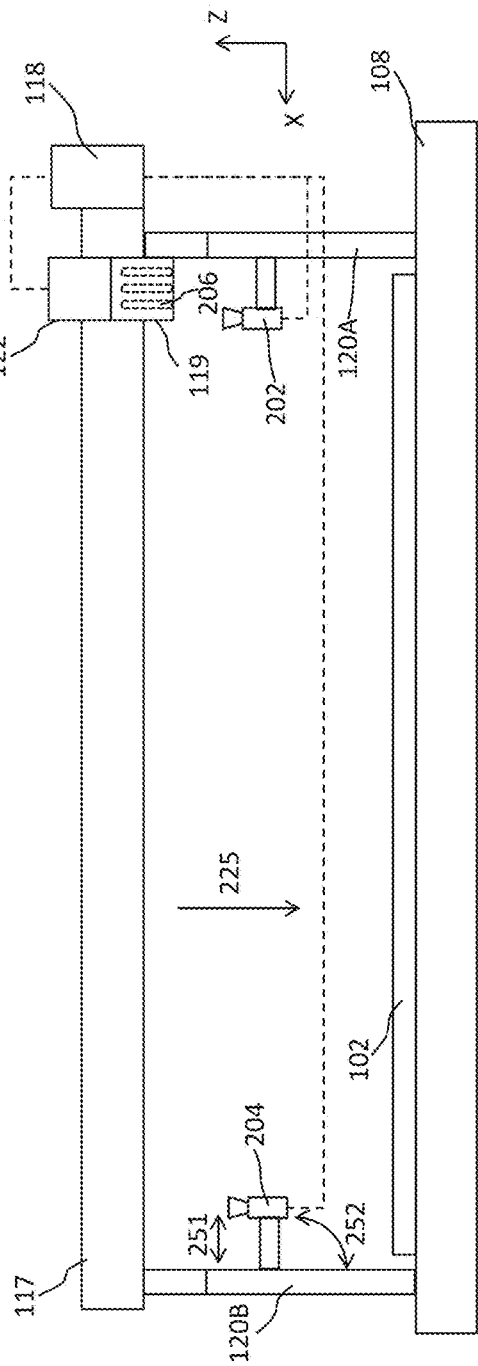

EJECTION CONTROL USING IMAGER

CROSS-REFERENCE TO RELATED APPLICATIONS

This application is a continuation of U.S. patent application Ser. No. 16/682,389, filed on Nov. 13, 2019, which claims the benefit from U.S. Provisional Patent Application Ser. No. 62/775,955 filed Dec. 6, 2018, and all are incorporated by reference herein in their entirety.

FIELD

Embodiments of the present application generally relate to inkjet printing systems. Specifically, methods, systems and/or apparatuses for ejection control in inkjet printing systems are described.

BACKGROUND

Inkjet printing is common, both in office and home printers and in industrial scale printers used for fabricating displays, printing large scale written materials, adding material to manufactured articles such as PCB's, and constructing biological articles such as tissues. Most commercial and industrial inkjet printers, and some consumer printers, use piezoelectric dispensers to apply print material to a substrate. A piezoelectric material is arranged adjacent to a print material reservoir. Applying a voltage to the piezoelectric material causes it to deform in a way that applies a compressive force to the print material reservoir, which is constructed in turn to eject print material when the compressive force is applied.

Some inkjet printing applications rely on extreme precision in positioning of dispensing nozzles and/or print substrates. Methods, systems and/or apparatuses for controlling ejection of print material in an inkjet printer are proposed in this aspect.

SUMMARY

In one embodiment, a printing system comprises a substrate support, a printhead assembly positioned facing the substrate support, and an imager. The printhead assembly comprises a plurality of dispensing nozzles extending in an ejection direction towards the substrate support and a plurality of marks. The imager is movable relative to the printhead assembly and oriented in a direction opposite to the ejection direction for capturing at least one image including the plurality of marks indicating positions of the plurality of dispensing nozzles in the printhead assembly.

In a printing method in accordance with one embodiment, an imager captures at least one image of a plurality of marks of a printhead assembly. The plurality of marks is detected in the at least one image captured by the imager. Positions of a plurality of dispensing nozzles in the printhead assembly are determined based on the detected plurality of marks. Print material is ejected from the plurality of dispensing nozzles onto a substrate, while moving the substrate relative to the printhead assembly, based on the detected positions of the plurality of dispensing nozzles.

In one embodiment, a printing system comprises a substrate support, a printhead assembly positioned facing the substrate support, a first imager, a second imager, and a controller. The printhead assembly comprises a plurality of dispensing nozzles extending in an ejection direction towards the substrate support, and a plurality of first marks. The first imager is movable relative to the printhead assembly and oriented in a direction opposite to the ejection direction for capturing at least one first image including the plurality of first marks indicating positions of the plurality of dispensing nozzles in the printhead assembly. The second imager is movable relative to the substrate support and oriented in a direction toward the substrate support for capturing at least one second image of a substrate on the substrate support. The controller is configured to control ejection of print material from the plurality of dispensing nozzles on the substrate, based on the at least one first image and the at least one second image.

In one embodiment, a flat panel display is made by a printing method in which an imager captures at least one image of a plurality of marks of a printhead assembly. The plurality of marks is detected in the at least one image captured by the line scan imager. Positions of a plurality of dispensing nozzles in the printhead assembly are determined based on the detected plurality of marks. Print material is ejected from the plurality of dispensing nozzles onto a substrate, while moving the substrate relative to the printhead assembly, based on the detected positions of the plurality of dispensing nozzles.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 2A-2B are schematic side views of a printing system in accordance with one embodiment, showing a printhead assembly at various positions.

DETAILED DESCRIPTION

Figure 1:
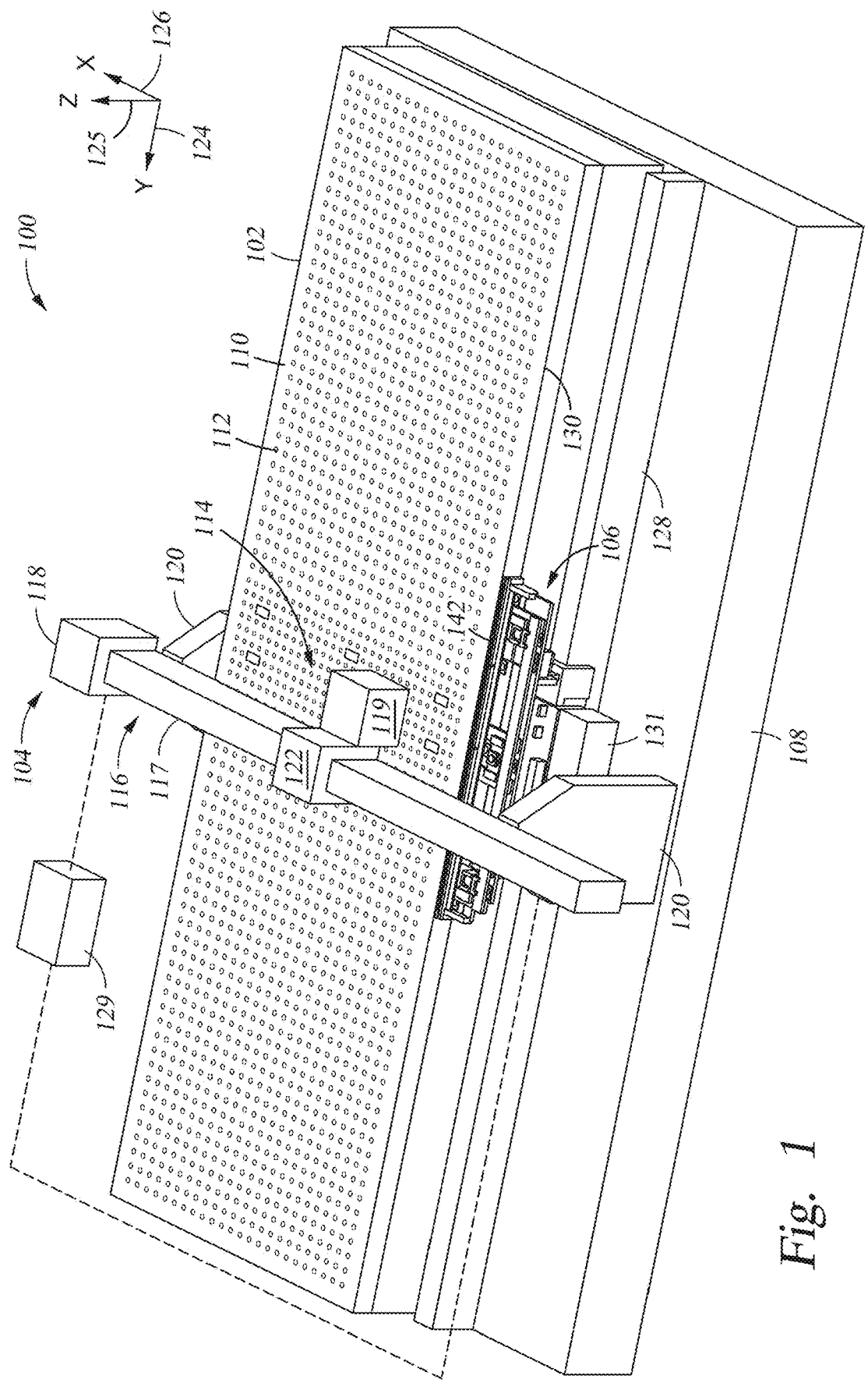
FIG. 1 is a top isometric view of a printing system in accordance with one embodiment.

The following disclosure provides many different embodiments, or examples, for implementing different features of the provided subject matter. Specific examples of components, values, operations, materials, arrangements, etc., are described below to simplify the present disclosure. These are, of course, merely examples and are not intended to be limiting. Other components, values, operations, materials, arrangements, etc., are contemplated. For example, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

High precision in positioning of dispensing nozzles and/or print substrates is relied on in some inkjet printing applications to obtain printed products of the intended high quality. For precise positioning of dispensing nozzles, nozzle mapping is performed to map positions of dispensing nozzles to corresponding positions in a frame of reference of an inkjet printing system. The mapped positions of the dispensing nozzles are then used for printing with high precision. Positions of dispensing nozzles for nozzle mapping are obtained from image data captured by a line scan imager in which image sensors are arranged along a line. Compared to other approaches that utilize an array of image sensors arranged in multiple columns and rows to capture image data, using a line scan imager significantly reduces the amount of time and complexity associated with image data capturing, which, in turn, speeds up printing processes.

FIG. 1 is a top isometric view of a printing system in accordance with one embodiments.

The printing system 100 has a substrate support 102, a print assembly 104, and a holder assembly 106 for manipulating a substrate for printing. The printing system 100 is founded upon a base 108, which is in one embodiment a massive object to minimize vibratory transmissions to the operative parts of the printing system 100. In one example, the base 108 is a granite block. The substrate support 102 is located upon the base 108, and comprises a support surface 110 along with a device for making the support surface 110 substantially frictionless. In one example, the support surface 110 is an air table that provides a gas cushion on which the substrate floats. The support surface 110 features a plurality of holes 112 that allow jets of gas to exit, thus providing an upward force to maintain a substrate at a desired elevation above the support surface 110. Some of the holes are configured to also allow controlled withdrawal of gas from the gas cushion floating the substrate to provide precise local control of substrate elevation.

The print assembly 104 comprises a dispenser assembly 114 disposed on a print support 116. The print support 116 is disposed in relation to the substrate support 102 to provide access for the dispenser assembly 114 to position constructively in relation to a substrate on the substrate support 102 to precisely apply print material to the substrate. The print support 116 includes a rail or beam 117 that traverses the substrate support 102, allowing the dispenser assembly 114 to traverse the substrate support 102 and deposit print material at any location on the substrate from one side of the print support 116 to the opposite side thereof. In one embodiment, the print support 116 is attached to the base 108 and extends from the base 108 to provide stable support for the dispenser assembly 114. Two stands 120 extend from the base 108, on opposite sides of the substrate support 102, to the rail 117, which extends across the substrate support 102. In one embodiment, the stands 120 and the rail 117 are both made of the same material as the base 108. In one example, the stands 120, the rail 117, and the base 108 are integrally formed from one piece of granite.

The dispenser assembly 114 includes at least one printhead assembly 119 along with a print assembly controller 118 that includes electronics and/or sensors for controlling the functional parameters of the printhead assembly 119 such as location of the printhead assembly 119 along the print support 116, timing, duration, type of print material, and dispensing profile. The printhead assembly 119 is movable along the rail 117 of the print support 116 by operation of a print carriage 122 that couples with the print support 116 to translate the printhead assembly 119 along the rail 117 from one end of the rail 117 to the other opposite end. In one example, the print carriage 122 is driven by a motor or a servomotor. Power and signal conduits are not shown to simplify the figure.

A substrate (not shown in FIG. 1) is positioned under the print assembly 104 by the holder assembly 106. The holder assembly 106 acquires secure contact with the substrate upon loading and moves the substrate along the substrate support 102 to position the substrate with respect to the print assembly 104 for dispensing print material onto the substrate in a precise fashion. The holder assembly 106 is located on one side of the substrate support 102 and extends along the substrate support 102 in a first direction to translate the substrate in the first direction during printing. The first direction is denoted in FIG. 1 by arrow 124. The first direction 124 is referred to as the "Y direction" or "scan direction." The printhead assembly 119 moves in a second direction substantially transverse to the first direction, guided by the rail 117 which extends substantially in the second direction denoted in FIG. 1 by arrow 126. The second direction 126 is referred to as the "X direction" or "cross-scan direction," and the rail 117 as the "X beam." A third direction substantially transverse to the first and second directions is denoted in FIG. 1 by arrow 125. The third direction 125 is referred to as the "Z direction." The X, Y and Z directions are directions of axes of a coordinate system serving as a frame of reference of the printing system 100, as illustrated by the arrows 124, 125, and 126. In at least one embodiment, the origin of the coordinate system is at a fixed point, e.g., associated with the base 108.

The holder assembly 106 is disposed on a holder assembly support 128, which in one embodiment is a rail that extends in the first direction substantially the entire length of the substrate support 102 along an edge 130 of the substrate support 102. In one embodiment, the holder assembly support 128 is attached to the base 108 to provide stable support for the holder assembly 106. In one embodiment, the holder assembly support 128 is made from the same material as the base 108. In one example, the holder assembly support 128, base 108, and print support 116 are integrally formed from one piece of granite. The holder assembly support 128 is referred to as a "Y beam." The holder assembly 106 moves along the holder assembly support 128 during operation to position the securely held substrate at any location on the substrate support 102, and the print assembly 104, for example by operation of the print assembly controller 118, positions the printhead assembly 119 to provide access to a precise location on the substrate for dispensing print material.

A system controller 129 receives signals from various sensors deployed throughout the printing system 100 and sends signals to various components of the printing system 100 to control printing. The system controller 129 is operationally coupled, for example, via a network, to the print assembly controller 118 and to a holder assembly controller 131, which controls operation of the holder assembly 106. One or more of the substrate support 102, the print assembly 104, the holder assembly 106, and other ancillary systems, such as environment control and materials management systems, have sensors operatively coupled to the system controller 129 to transmit signals to the system controller 129 related to the status of various components during a printing operation. The system controller 129 includes data and instructions to determine control signals to send to various controlled components of the printing system 100. In one embodiment, two or more of the system controller 129, the print assembly controller 118 and the holder assembly controller 131 are integrated into a single controller. In one embodiment, at least one of the system controller 129, the print assembly controller 118 and the holder assembly controller 131 is implemented as several controllers distributed in the printing system 100 and connected one with another via a network. An example configuration of a controller in accordance with one embodiment is described with respect to FIG. 7. For simplicity, in the description below, "controller" refers to any one or more of controllers in the printing system 100.

To perform precision inkjet printing, microscopic droplets of print material are placed in correspondingly small areas of the substrate. For example, in some cases print material droplets having diameter of 10-30 μm are placed in an area of the substrate of dimension 25-200 μm. This is often done while the substrate is moving in the Y direction (scan direction) to minimize print time. Such extreme precision is complicated by many factors, such as tiny imperfections in the dimensions and/or positions of the various parts of the printing system 100, variation of those dimensions with temperature, imprecision in the substrate such as mis-positioning of prior structures formed on the substrate, imprecision in speed of translation of the substrate, the dispenser assembly 114, and the holder assembly 106, and imprecision in the distance of the substrate from the printhead assembly 119. For example, if positions of the dispensing nozzles in the printhead assembly 119 in the frame of reference of the printing system 100 are not precisely known or controlled, it is difficult to control print material droplets from the dispensing nozzles in the printhead assembly 119 for the print material droplets to arrive at the target locations when the substrate is in the proper position. In this aspect, nozzle mapping is performed to determine or control positions of the dispensing nozzles in the frame of reference of the printing system 100. In other aspects, features of the substrate are mapped to the frame of reference of the printing system 100 to compensate for any misalignment of the substrate.

FIGS. 2A-2B are schematic side views of a printing system 200 in accordance with one embodiment, showing a printhead assembly at various positions. In one embodiment, the printing system 200 includes one or more features of the printing system 100 described herein.

As shown in FIGS. 2A-2B, the printing system 200 comprises the substrate support 102 and an imager 202, with the printhead assembly 119 positioned facing the substrate support 102. Here, the imager 202 is a line scan imager, but other imagers can be used. The printhead assembly 119 comprises a plurality of dispensing nozzles 206 extending in an ejection direction 225 towards the substrate support 102. The printhead assembly 119 includes a plurality of marks (also referred to as "housing marks") as described herein with respect to FIGS. 3A-3B. The line scan imager 202 is movable relative to the printhead assembly 119. For example, FIGS. 2A-2B show different relative positions between the line scan imager 202 and the printhead assembly 119. Here, the printhead assembly 119 is coupled with the rail 117 by an air bearing assembly or other low friction coupling means (not shown), and a linear actuator coupled between the printhead assembly 119 and one or both of the stands 120 moves the printhead assembly 119 in the cross-scan direction. The line scan imager 202 is oriented in a direction opposite to the ejection direction 225 for capturing at least one image including the plurality of marks for determining positions of the dispensing nozzles 206 in the printhead assembly. In the example configuration in FIGS. 2A-2B, the ejection direction 225 is opposite to the Z direction, and the line scan imager 202 is oriented in the Z direction opposite to the ejection direction 225.

In one embodiment, the line scan imager 202 is stationary relative to the substrate support 102. For example, here the line scan imager 202 is fixed to a stand 120A of two stands 120A, 120B which are similar to the stands 120 of the printing system 100 and extend from the base 108 on opposite sides of the substrate support 102. The printhead assembly 119 is movable in the cross-scan direction (X direction) relative to the line scan imager 202 and the substrate support 102, for example, from a position at the middle of the rail 117, as shown in FIG. 2A, to a position adjacent the stand 120A facing the line scan imager 202, as shown in FIG. 2B. During the passing of the printhead assembly 119 by the line scan imager 202 in the vicinity of the position shown in FIG. 2B, the printhead assembly 119 is positionable in an imaging field of the line scan imager 202 which captures at least one image of the dispensing nozzles 206 facing the line scan imager 202. The captured image is transferred to the controller 118, or another controller of the printing system 100, which is coupled to the line scan imager 202 as shown in FIGS. 2A-2B.

The above arrangement of the line scan imager 202 is an example configuration. Other configurations are within the scopes of various embodiments. In an example, another imager 204, in this case also a line scan imager, is shown fixed to the stand 120B on the opposite side of the substrate support 102, to enable imaging of the dispensing nozzles 206 by moving the printhead assembly 119 to either side of the substrate support 102. In one embodiment, the line scan imager 204 is omitted, or more than two line scan imagers are included in the printing system 200. In another example, in at least one embodiment, the line scan imager 202, or line scan imager 204, is movable, e.g., by a motor, relative to the substrate support 102 to be located at a predetermined image capturing position as shown in FIG. 2B for capturing an image of the dispensing nozzles 206. For example, as shown in FIG. 2B, after capturing the image, the line scan imager 204 is moved away, e.g., retracted as shown by arrow 251 or swung as shown by arrow 252, from the image capturing position to avoid interfering with the printing process. In yet another example, instead of moving the printhead assembly 119 over a stationary line scan imager 202 for image capturing as described with respect to FIGS. 2B, the line scan imager 202 is physically moved relative to a stationary printhead assembly 119, or both the line scan imager 202 and the printhead assembly 119 are physically moved one by the other, for image capturing. For example, the line scan imager 202 can be coupled to the rail 117 by a linear positioner so the line scan imager 202 can move relative to the printhead assembly 119 to a position facing the printhead assembly 119 to capture an image of the dispensing nozzles 206.

Figure 2C:
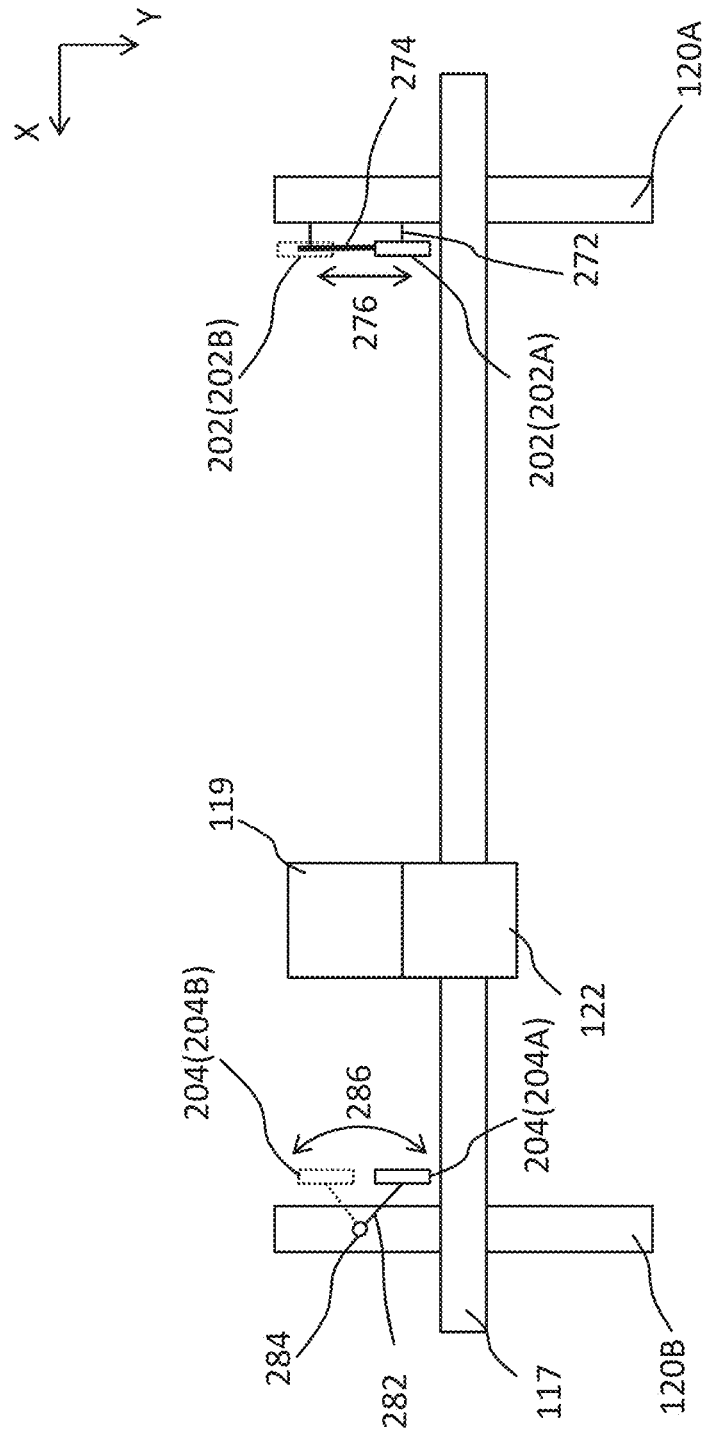
FIG. 2C is a schematic top view of a printing system in accordance with a further embodiment.

FIG. 2C is a schematic top view of the printing system 200 in accordance with a further embodiment. For simplicity, several elements such as the substrate support 102 and the base 108 are omitted from FIG. 2C. In the example configuration in FIG. 2C, the line scan imager 202 and/or the line scan imager 204 are movable, for example, by a motor, along the Y direction to scan and capture images of the dispensing nozzles 206. For example, the line scan imager 202 is coupled via a motorized carriage (not visible in FIG. 2C) to a rail 274 located along an inside edge of, and supported by, the stand 120A. The rail 274 is attached to the stand 120A by a connection member 272. The line scan imager 202 is linearly movable along the rail 274, as shown by arrow 276, between positions 202A and 202B. For a further example, the line scan imager 204 is coupled via a swivel mount 282 to a pivot 284 located on or supported by the stand 120B. The line scan imager 204 is pivotally movable about the pivot 284, as shown by arrow 286, between positions 204A and 204B. Where multiple cameras are used, each camera may be coupled to the printing system 200 by either of the methods described above, and different types of couplings can be used for different cameras.

Figure 3A:
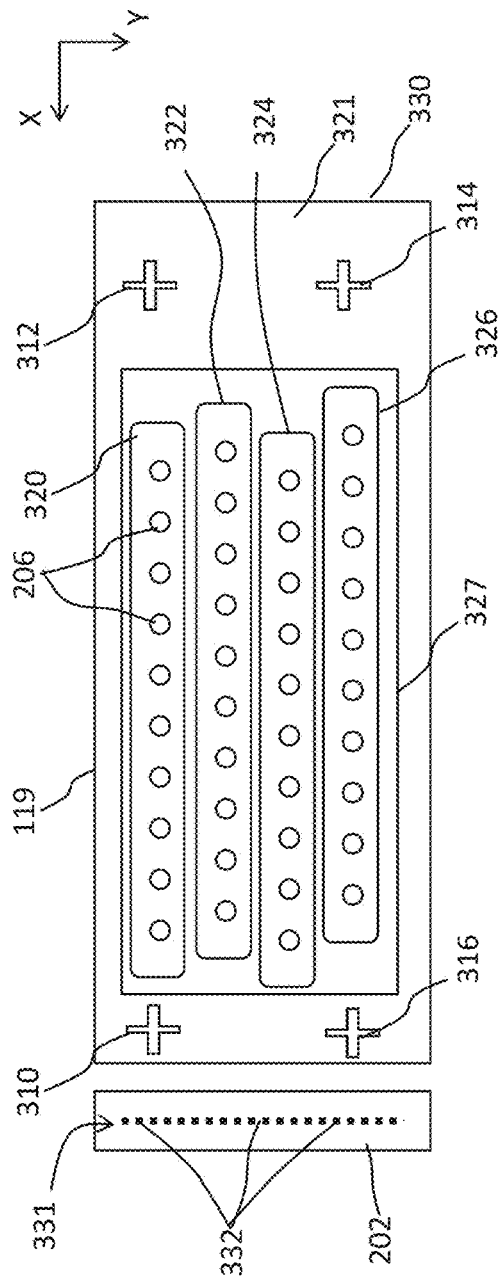
FIGS. 3A-3B are schematic plan views of imagers and printhead assemblies in accordance with various embodiments.

FIG. 3A is a schematic plan view of the line scan imager 202 and the printhead assembly 119 in accordance with one embodiment. FIG. 3A shows a combined view of a top plan view of the line scan imager 202 (as seen downward in the ejection direction 225 in FIG. 2A) placed side-by-side with a bottom plan view of the printhead assembly 119 (as seen upward in the Z direction in FIG. 2A). A nozzle surface 321 of a housing or body 330 of the printhead assembly 119 is shown. A dispensing end of each dispensing nozzle 206 is disposed at the nozzle surface 321.

Figure 3B:
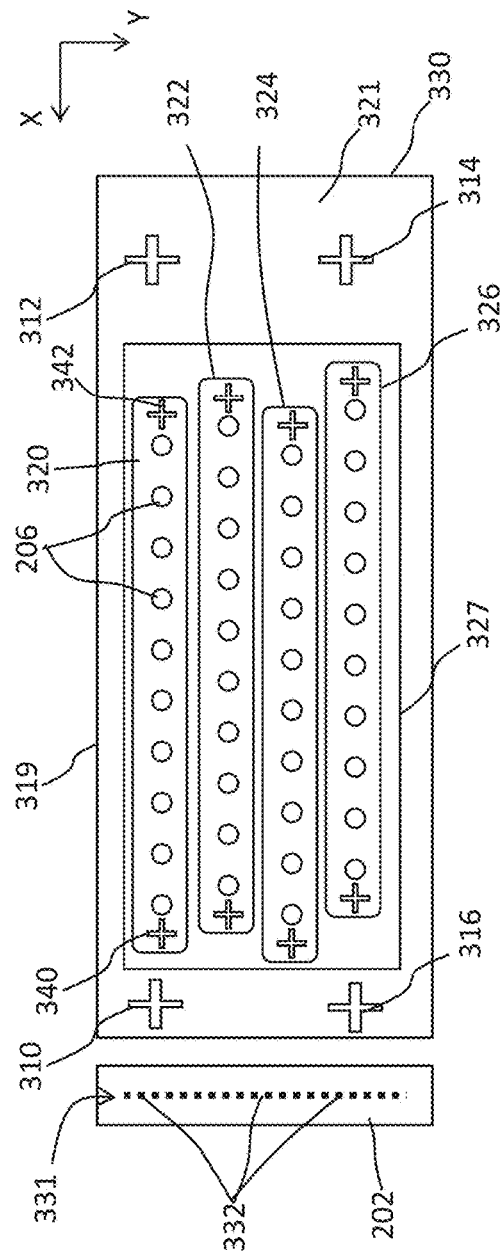

The line scan imager 202 comprises a plurality of image sensors 332. In one embodiment as shown in FIGS. 3A-3B, all image sensors 332 of the line scan imager 202 are arranged in a single line, e.g., line 331, along the scan direction (Y direction). In another embodiment (not shown), the image sensors 332 of the line scan imager 202 are arranged in more than one lines. For example, the image sensors 332 in a first line are configured as primary image sensors for capturing image data for nozzle mapping, whereas image sensors 332 in a second line are configured as redundancy or secondary sensors for providing image data in case one or more primary image sensors fail. The image sensors 332 are photoelectric devices that capture light reflected from the nozzle surface 321 of the printhead assembly 119 toward the line scan imager 202 and register electric signals in accordance with the captured light. The image sensors 332 capture an image of the printhead assembly 119 while the printhead assembly 119 is moving over and relative to the line scan imager 202 in the cross-scan direction (X direction). In this aspect, the image capturing by the line scan imager 202 is similar to that performed by a copying machine or a scanner which uses a similar linear photo sensor arrangement. To capture images of features having dimensions in the range of a few µm, for example, 5-10 µm, the image sensors 332 are configured to provide a high resolution of, for example, about 0.1 µm. Examples of image sensors include, but are not limited to, CMOS (complementary metal oxide semiconductor) and CCD (charge coupled device) sensors.

In one embodiment, ambient light provides lighting for image capturing by the line scan imager 202. However, due to optical properties of the environment in which the line scan imager 202 operates, at least one light source (not shown) is provided in at least one embodiment to illuminate the nozzle surface 321 of the printhead assembly 119 during image capturing. Various parameters, such as wavelength, intensity, pulsation, and/or incident angle, of the light emitted by the light source are selected and/or varied depending on one or more considerations including, but not limited to, the reflective nature of the nozzle surface 321, color and/or other optical properties of the dispensing nozzles 206 and a plurality of marks on the nozzle surface 321, as well as the atmosphere around the line scan imager 202 which, in one example, is an inert environment. Visible light is used in one embodiment, while non-visible light (i.e. electromagnetic radiation outside the visible spectrum) is used in other embodiments, to illuminate the nozzle surface 321 of the printhead assembly 119 during image capturing. The light source can be integrated with the line scan imager 202, for example as a white LED source disposed in a sensor surface of the line scan imager 202 facing the nozzle surface 321 of the printhead assembly 119.

The dispensing nozzles 206 are visible at the nozzle surface 321 of the printhead assembly 119. In the example configuration in FIGS. 3A-3B, the dispensing nozzles 206 are arranged in one or more rows extending in the X direction. For example, four rows of dispensing nozzles 206 are shown in FIGS. 3A-3B as corresponding to four printheads 320, 322, 324, 326. The number of rows of dispensing nozzles 206 in the printhead assembly 119 and/or the number of dispensing nozzles 206 in each row as shown in FIG. 3A are examples, and vary from one printing system and/or printhead assembly to another. Some printhead assemblies can have dispensing nozzles that are not arranged in a particular pattern. In high precision printing systems, there can be thousands of dispensing nozzles in each printhead assembly. In one embodiment and as can be seen in FIG. 3A, the line 331 of the image sensors 332 of the line scan imager 202 is sufficiently long to extend fully across all rows of dispensing nozzles 206 of the printhead assembly 119 in the Y direction. Alternatively, for a printhead assembly in which dispensing nozzles are not arranged in a particular pattern, the single line 331 of the image sensors 332 of the line scan imager 202 is sufficiently long to extend fully across the whole width (in the Y direction) of the area of the nozzle surface in which all dispensing nozzles are arranged. Accordingly, with this arrangement, it is possible to capture an image that covers or includes all dispensing nozzles 206 of the printhead assembly 119, in a single pass of the printhead assembly 119 in the X direction by the line scan imager 202.

However, in situations where the length of the line 331 is not sufficient to cover all dispensing nozzles 206 in one pass (i.e. the line scan camera is smaller than the width of the nozzle surface 321, as shown in FIG. 2C), multiple line scan imagers 202/204 and/or multiple passes of at least one line scan imager 202/204 can be used to obtain multiple images each covering a corresponding portion of the nozzle surface 321. For example, the arrangement described with respect to FIG. 2C can be used to move the line scan imager 202/204 to a new position for capturing an image of another portion of the nozzle surface 321. Alternately, two or more cameras 202 can be arranged along the y-direction in FIG. 2C to scan the entire nozzle surface 321 in a single pass. The multiple images are then spliced, for example, by the controller 118, into a bigger image that covers all dispensing nozzles 206 of the printhead assembly 119 for use in nozzle mapping.

In general, the line scan imager 202 (or 204) typically includes a plurality of image sensors arranged along a line in a first direction, and the line scan imager and nozzle surface 321 are moved relative to one another in a second direction perpendicular to the first direction. Thus, the line of image sensors is scanned across the nozzle surface 321. If an area to be scanned on the nozzle surface 321 has a dimension in the first direction that is larger than the length of the line scan imager in the first direction, use of one line scan imager would require the nozzle surface 321 to be repositioned after one scan for a second scan of the area not reached by the first scan, increasing the time to complete the scan. In such cases, two or more line scan imagers can be used to simultaneously scan an area larger than that accessible by one of the line scan imagers in a single scan. The two or more line scan imagers may be adjacent or non-adjacent, and the images captured by the two or more line scan imagers may be combined into a composite image for processing, or may be processed individually. For example, if one or more marks on the nozzle surface 321 are to be imaged, and the one or more marks cover an area that cannot be imaged by a single line scan imager in a single scan, two or more line scan imagers can be used to image the area of the marks, or any part thereof, that is larger than the field of view of a single line scan imager. The entire area of the marks can be imaged by multiple line scan imagers imaging adjacent portions of the mark area, and the imaged can be combined into a composite image of the entire mark area. Alternately, portions of the mark area separated by a distance that renders the portions inaccessible by a single line scanner in a single scan can be imaged by two or more line scan imagers. Additionally, if the dispensing nozzles are to be imaged, and the area to be imaged is larger than the field of view of a single line scan imager, two or more line scan imagers can be used as described above.

In the example configuration in FIG. 3A, there are four rows of dispensing nozzles 206 in a plurality of printheads, each line belonging to a respective printhead 320, 322, 324, 326. Each of the printheads 320, 322, 324, 326 is implemented in the form of a cartridge or card that is removably disposed in a corresponding slot or area inside a middle region 327 of the nozzle surface 321 of the printhead assembly 119. Once installed in the corresponding slots or areas inside the middle region 327, the printheads 320, 322, 324, 326 are coupled to receive print material and control signals that cause the dispensing nozzles 206 of the printheads 320, 322, 324, 326 to eject the print material on a substrate supported on the substrate support 102. In one embodiment, the printheads 320, 322, 324, 326 have piezoelectric material or transducers (not shown) corresponding to the dispensing nozzles 206. Upon receipt of control signals, the piezoelectric material or transducers deform and cause ejection of the print material from the corresponding dispensing nozzles 206 on the substrate. Other configurations, e.g., other types of transducers and/or dispensing nozzle arrangements, can also be used. The printheads 320, 322, 324, 326 can be removed from the printhead assembly 119 for service, maintenance and/or replacement, and thereafter, installed back into the printhead assembly 119. The repeated detachment and attachment of the printheads 320, 322, 324, 326 with associated machining and/or installation errors can change the position or orientation of the dispensing nozzles 206 in the printhead assembly 119 which, in turn, cause misalignment between the dispensing nozzles and the intended print region on the substrate and potentially result in a defective printed product. To address this issue, the positions of the nozzles can be mapped using methods and apparatus described herein.

For nozzle mapping, on or in the nozzle surface 321 of the housing or body 330, the printhead assembly 119 has a plurality of housing marks, here four housing marks 310, 312, 314, 316, for determining positions of the dispensing nozzles 206 in the printhead assembly 119. In the example configuration in FIG. 3A, the housing marks 310, 312, 314, 316 are arranged around the middle region 327 where the dispensing nozzles 206 are located. However, other arrangements of the housing marks 310, 312, 314, 316 on or in the nozzle surface 321 and/or with respect to the dispensing nozzles 206 can be used. In one embodiment, the housing marks 310, 312, 314, 316 are referred to as "fiducial marks" and have one or more known properties such as patterns, orientation, dimensions, and positions on the nozzle surface 321 of the printhead assembly 119. The housing marks 310, 312, 314, 316 are attached to (e.g., by adhesive), or etched or machined in, or printed or painted on the nozzle surface 321 of the printhead assembly 119. Other manners for providing fiducial marks to a printhead assembly can be used. The number and/or shapes of the housing marks 310, 312, 314, 316 in the example configuration in FIG. 3A are examples. Any number and/or shape and/or material and/or orientation of the housing marks 310, 312, 314, 316 can be used. In one example, any of the housing marks 310, 312, 314, 316 could include text, bar code, company's name and/or logo. With a higher number of fiducial marks and/or more complex mark shapes, the accuracy of the positions of the dispensing nozzles 206 determined using the housing marks 310, 312, 314, 316 increases.

To determine the positions of the dispensing nozzles 206 in the printhead assembly 119 using the housing marks 310, 312, 314, 316, the line scan imager 202 is controlled by the controller 118 to capture an image of the nozzle surface 321 of the printhead assembly 119 while the printhead assembly 119 passes by the line scan imager 202. The captured image is transmitted from the line scan imager 202 to the controller 118 which detects the housing marks 310, 312, 314, 316, and at least one dispensing nozzle 206, from the captured image. Image processing algorithms and/or software and/or programs for recognizing objects based on their known properties such as patterns, positions, sizes and/or orientations are known in the art of image processing, and are not described in detail herein. In one embodiment, the controller 118 relies on such known algorithms and/or software and/or programs for recognizing the housing marks 310, 312, 314, 316 and at least one dispensing nozzle 206 from the captured image.

In at least one embodiment, the known properties (e.g., one or more of patterns, orientation, dimensions, positions) of the housing marks 310, 312, 314, 316, as well as the known shape (e.g., circular) and size of each dispensing nozzle 206 and its expected position relative to the housing marks 310, 312, 314, 316, are used by the controller 118. For example, the known properties of the housing marks 310, 312, 314, 316, are included in printhead assembly configuration data stored in and/or accessible by the controller 118. The printhead assembly configuration data may further include other data related to the dispensing nozzles 206 including, but not limited to, at least one of number of rows of dispensing nozzles, number of dispensing nozzles per row, spacing between adjacent dispensing nozzles in a row or column of dispensing nozzles, spacing between adjacent rows and/or adjacent columns, spatial relationships between each row of dispensing nozzles and the housing marks, etc. In one aspect, the printhead assembly configuration data is a coordinate map representing the housing marks and the dispensing nozzles, for example a series of x-y positions on or within the housing marks and the dispensing nozzles. From the printhead assembly configuration data, it is possible for the controller 118 to determine expected position of each dispensing nozzle 206 relative to the housing marks 310, 312, 314, 316. Once the housing marks 310, 312, 314, 316 and at least one dispensing nozzle 206 have been recognized by the controller 118 from the captured image, their positions as recognized from the captured image are compared to their positions known/expected from the printhead assembly configuration data. From the comparison, the controller 118 derives a relationship for converting between positions recognized from the captured image and known/expected positions from printhead assembly configuration data. The derived relationship and the expected positions of all other dispensing nozzles 206 are used by the controller 118 to interpolate positions of all other dispensing nozzles 206 in the printhead assembly 119, using, for example, bilinear interpolation including one or more interpolation operations such as translational, rotational, skew and scaling. As a result, positions of all dispensing nozzles 206 in the printhead assembly 119 are determined.

The controller 118 then maps the determined positions of all dispensing nozzles 206 in the printhead assembly 119 to corresponding positions in the frame of reference of the printing system, e.g., a coordinate system having axes in the X, Y and Z directions as discussed herein. This is possible because the printhead assembly 119 has at least one known position in the frame of reference of the printing system under control by the controller 118. In one embodiment, the mapping of the determined positions of all dispensing nozzles 206 to corresponding positions in the frame of reference of the printing system involves bilinear interpolation including one or more interpolation operations such as translational, rotational, skew and scaling.

Based on the mapped positions of the dispensing nozzles 206 in the frame of reference of the printing system, the controller 118 controls ejection of print material from the dispensing nozzles 206 on a substrate supported by the substrate support 102. Because the mapped positions of the dispensing nozzles 206 reflect the actual detected positions of the dispensing nozzles 206 with high accuracy, printing accuracy is improved.

FIG. 3B is a schematic plan view of the line scan imager 202 and a printhead assembly 319 in accordance with one embodiment. In one embodiment, the printhead assembly 319 includes one or more features of the printhead assembly 119 described herein. FIG. 3B shows a top plan view of the line scan imager 202 (as seen downward in the ejection direction 225 in FIG. 2A), and a bottom plan view of the printhead assembly 319 (as seen upward in the Z direction in FIG. 2A).

Compared to the printhead assembly 119, the printhead assembly 319 additionally comprises a plurality of printhead marks having predetermined (or known) positions relative to the dispensing nozzles 206. Like the housing marks 310, 312, 314, 316, any number and/or shape and/or material and/or orientation of the printhead marks is/are applicable. For example, the printhead 320 includes printhead marks 340, 342 having predetermined positions relative to the dispensing nozzles 206 of the printhead 320. Each of the other printheads 322, 324, 326 includes similar printhead marks having predetermined positions relative to the dispensing nozzles 206 of the respective printheads 322, 324, 326. The description below is given for the printhead 320, and is applicable to the other printheads 322, 324, 326.

In at least one embodiment, the printhead marks 340, 342 are formed on or in the bottom surface of the printhead 320 so as to have a fixed positional relationship with the dispensing nozzles 206 in the printhead 320. Similar to the description of FIG. 3A, the line scan imager 202 is controlled by the controller 118 to capture an image of the nozzle surface 321 of the printhead assembly 319 while the printhead assembly 319 passes by the line scan imager 202. The captured image is transmitted from the line scan imager 202 to the controller 118 which detects the housing marks 310, 312, 314, 316, and the printhead marks 340, 342, from the captured image. From the printhead assembly configuration data, it is possible for the controller 118 to determine expected positions of the printhead marks 340, 342 relative to the housing marks 310, 312, 314, 316. Once the housing marks 310, 312, 314, 316 and the printhead marks 340, 342 have been recognized by the controller 118, the controller 118 derives a relationship for converting between positions and orientations recognized from the captured image and known/expected positions and orientations from printhead assembly configuration data. The derived relationship and the expected positions and orientations of the printhead marks 340, 342 are used by the controller 118 to interpolate their positions and orientations in the printhead assembly 319, which, in turn, are used by the controller 118 to interpolate positions of the dispensing nozzles 206 of the printhead 320 in the printhead assembly 319. The described process is applicable to the other printheads 322, 324, 326. As a result, positions of all dispensing nozzles 206 in the printhead assembly 319 are accurately determined. The controller 118 then performs nozzle mapping and print material ejection control based on the determined positions of the dispensing nozzles 206, as described with respect to FIG. 3A.

In at least one embodiment, as the printhead marks 340, 342 are fixed to the printhead 320, the detachment and attachment of the printhead 320 from/to the printhead assembly 319 does not affect the positional relationship between the printhead marks 340, 342 and the dispensing nozzles 206 in the printhead 320. Therefore, it is possible to determine positions of the dispensing nozzles 206 of the printhead 320 by detecting the printhead marks 340, 342, instead of directly detecting at least one dispensing nozzle 206 as in the printhead assembly 119 described with respect to FIG. 3A. In one embodiment, the printhead marks 340, 342 are larger and have a more distinctive (i.e., easier recognizable) shape than the densely placed, small (a few μm in diameter), circular dispensing nozzles 206. As a result, it is easier for the controller 118 to detect the printhead marks 340, 342 than detecting the dispensing nozzles 206 which, in turn, improves at least one of speed or accuracy of the nozzle mapping process. This effect becomes noticeable in inkjet printing applications where there are thousand small dispensing nozzles arranged at a small interval in a printhead assembly, making it difficult to recognize one or more dispensing nozzles from a captured image, especially when the dispensing nozzles are obscured by print material from a previous printing operation. Although one embodiment provide a cleaning mechanism (not shown) to clean the dispensing nozzles prior to image capturing, the provision of the printhead marks with a fixed positional relationship to the dispensing nozzles for nozzle mapping is still advantageous.

Figure 4:
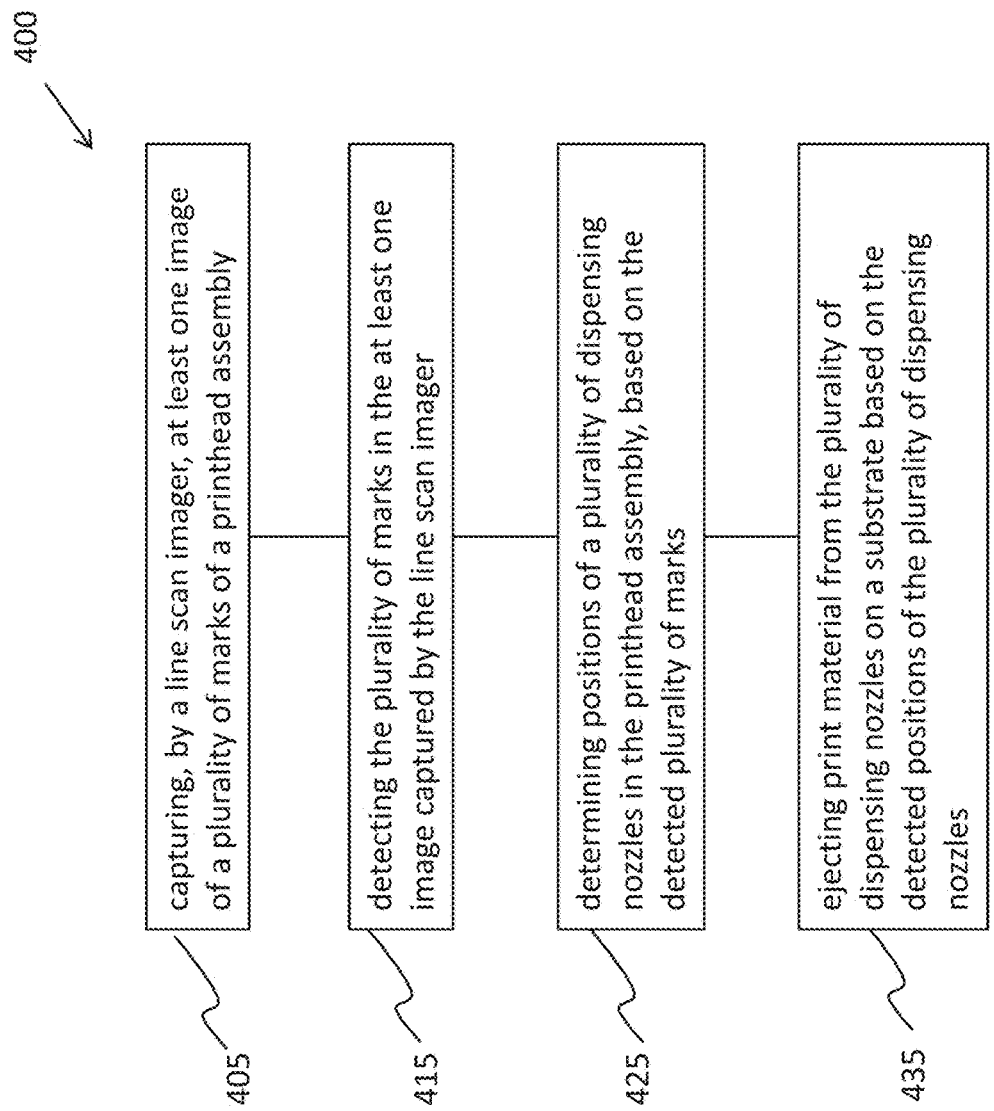
FIG. 4 is a flowchart of a printing method in accordance with one embodiment.

FIG. 4 is a flowchart of a printing method 400 in accordance with one embodiment. The printing method 400 can be performed in the printing system 200 by, or under control of, at least one controller as described herein. In the description below, the printing method 400 is performed by, or under control of, the controller 118.

At operation 405, a controller causes an imager to capture at least one image of a plurality of marks of a printhead assembly. For example, the controller 118 causes the printhead assembly 119 to move by the line scan imager 202 in the vicinity of the image capturing position as described with respect to FIG. 2B. The controller 118 further causes the line scan imager 202 to capture an image of the nozzle surface 321 of the printhead assembly 119 during the passing of the printhead assembly 119 by the line scan imager 202. The captured image includes at least a plurality of marks 310, 312, 314, 316 of the printhead assembly 119.

At operation 415, the controller detects the plurality of marks in the at least one image captured by the imager. For example, the controller 118 detects or recognizes the plurality of marks 310, 312, 314, 316 in the image captured by the line scan imager 202, by using one or more known image processing algorithms and/or software and/or programs as described herein.

At operation 425, the controller detects positions of a plurality of dispensing nozzles in the printhead assembly, based on the detected plurality of marks. In an example, the controller 118 detects or recognizes at least one dispensing nozzle 206, and uses positions of the detected at least one dispensing nozzle 206 and the detected housing marks 310, 312, 314, 316 to determine positions of all other dispensing nozzles 206 in the printhead assembly 119, as described with respect to FIG. 3A. In another example, the controller 118 detects or recognizes printhead marks 340, 342 having predetermined positions relative to dispensing nozzles 206 of the printhead 320, and uses positions of the detected housing marks 310, 312, 314, 316 and the detected printhead marks 340, 342 to determine positions of all dispensing nozzles 206 in the printhead assembly 319, as described with respect to FIG. 3B. Thus, while it may be impossible or impractical to directly image and recognize all dispensing nozzles of a printhead assembly, by imaging and recognizing housing marks of the printhead assembly and either a nozzle or a printhead mark associated with the dispensing nozzles, it is possible to determine positions of all dispensing nozzles in the printhead assembly.

At operation 435, the controller controls ejection of print material from the plurality of dispensing nozzles on a substrate, based on the detected positions of the plurality of dispensing nozzles. For example, the controller 118 maps the determined positions of the dispensing nozzles 206 in the printhead assembly 119 or 319 to corresponding positions in a frame of reference of the printing system, based on known positions of the printhead assembly in the frame of reference of the printing system as described herein. The controller 118 then uses the mapped positions of the dispensing nozzles 206 in the frame of reference of the printing system to control, when and/or which dispensing nozzles to eject print material in accordance with a recipe which includes printing data or coordinates in the frame of reference of the printing system. As a result, printed products with high printing precision are obtainable. For example, if a print nozzle is found at a location different from its expected location by a distance d, a droplet ejected according to an existing print plan will arrive at a location different from its target location t by the distance d. If the distance d has an x-component $d_x$, the printhead assembly can be adjusted by $-d_x$ to compensate. If the print nozzles deviate in the x direction from their expected locations by an average distance $\bar{d}_x$ the print assembly can be adjusted by $-\bar{d}_x$ to compensate. If the distance d has a y-component $d_y$, the print plan can be adjusted with a global firing delay of $d_y/v'$ where v is the translation velocity of the substrate in the y-direction, and likewise for a y-component of the average distance $\bar{d}_y$.

In one embodiment, printed products manufactured by the described printing method include, but are not limited to, solar panels, and flat panel displays such as organic light emitting diode (OLED) displays.

In one embodiment, nozzle mapping as described herein is performed upon initialization of the printing system and/or between printing operations. In at least one embodiment nozzle mapping as described herein is performed during a printing operation, e.g., by moving the printhead assembly 119 from a printing position as shown in FIG. 2A, to the image capturing position as described with respect to FIG. 2B for image capturing and nozzle mapping, and then returning the printhead assembly 119 back to the printing position to continue the printing operation based on a result of the nozzle mapping.

One embodiment uses a line scan imager having a line of photo sensors at least as long as the range of dispensing nozzles in the printhead assembly. As a result, a high resolution image covering all dispensing nozzles is obtainable by a single pass of the printhead assembly by the line scan imager, saving printer initialization time and/or reducing printing interruption.

Compared to other approaches that utilize an array of image sensors arranged in multiple columns and rows to capture image data, one embodiment using a line scan imager significantly reduces the time and complexity associated with image data capturing, which, in turn, speeds up nozzle mapping, printer initialization and/or printing processes. In some situations, it takes a regular camera with an array of photo sensors 15-20 minutes to capture images of sufficient quality for nozzle mapping, whereas in the same situations, it takes a line scan imager in accordance with one embodiment a few minutes to capture a high resolution image suitable for nozzle mapping. A reason is that for the regular camera to capture an acceptable image of thousand densely packed dispensing nozzles, the regular camera should be properly aligned with the printhead assembly. Such camera alignment takes time. While such imagers can be used with methods and apparatus described herein, using a line scan imager for image capturing in most cases eliminates the need for camera alignment; instead, a simple, single pass of the printhead assembly by the line scan imager is sufficient for high quality, high resolution image capturing. Even when several passes are required for imaging the whole nozzle surface as discussed herein, the imaging speed is still an improvement over the other approaches that utilize regular cameras. Accordingly, the imaging speed is faster which, in addition to higher throughput, enables less time between measurements. As a result, it is possible to perform more frequent measurements and/or corrections in a printing operation which, in turn, improves print accuracy.

Figure 5A:
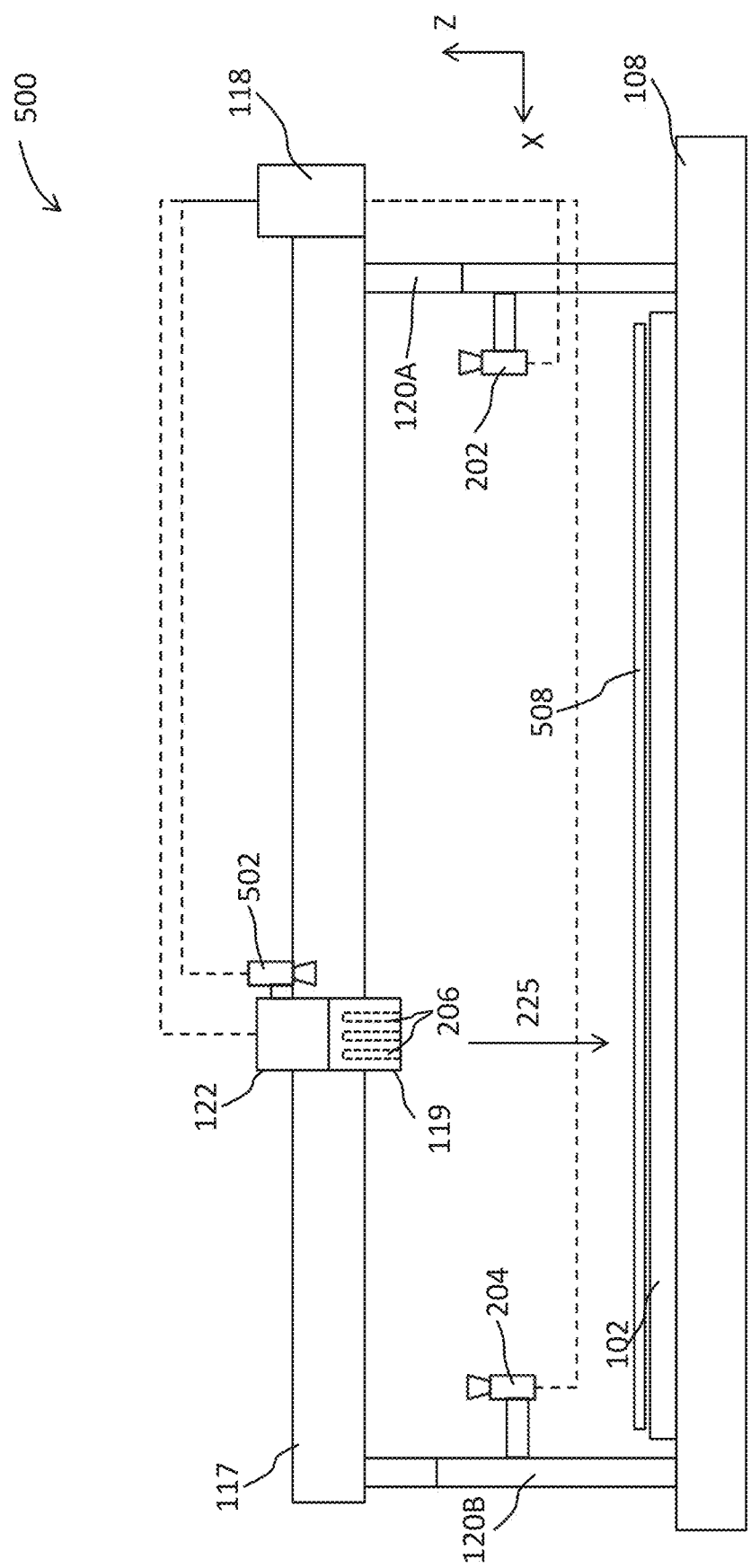
FIG. 5A is a schematic side view of a printing system in accordance with one embodiment.

FIG. 5A is a schematic side view of a printing system 500 in accordance with one embodiment. In one embodiment, the printing system 500 includes one or more features of the printing system 100 and/or the printing system 200 described herein.

Compared to the printing system 200, the printing system 500 additionally includes a second imager 502 movable relative to the substrate support 102 and oriented in a direction toward the substrate support for capturing at least one second image of a substrate 508 on the substrate support 102. In an example, the substrate 508 is a glass substrate. Other substrate materials are within the scopes of various embodiments. In the example configuration in FIG. 5A, the imager 502 is attached to the print carriage 122 to be movable together with the printhead assembly 119 relative to the substrate 508. In another example configuration (not shown), the imager 502 is movable, e.g., by a driving axis or motor, independently of the printhead assembly 119. For example, the imager 502 may have its own actuated coupling to the rail 117 that can be independently actuated.

Figure 5B:
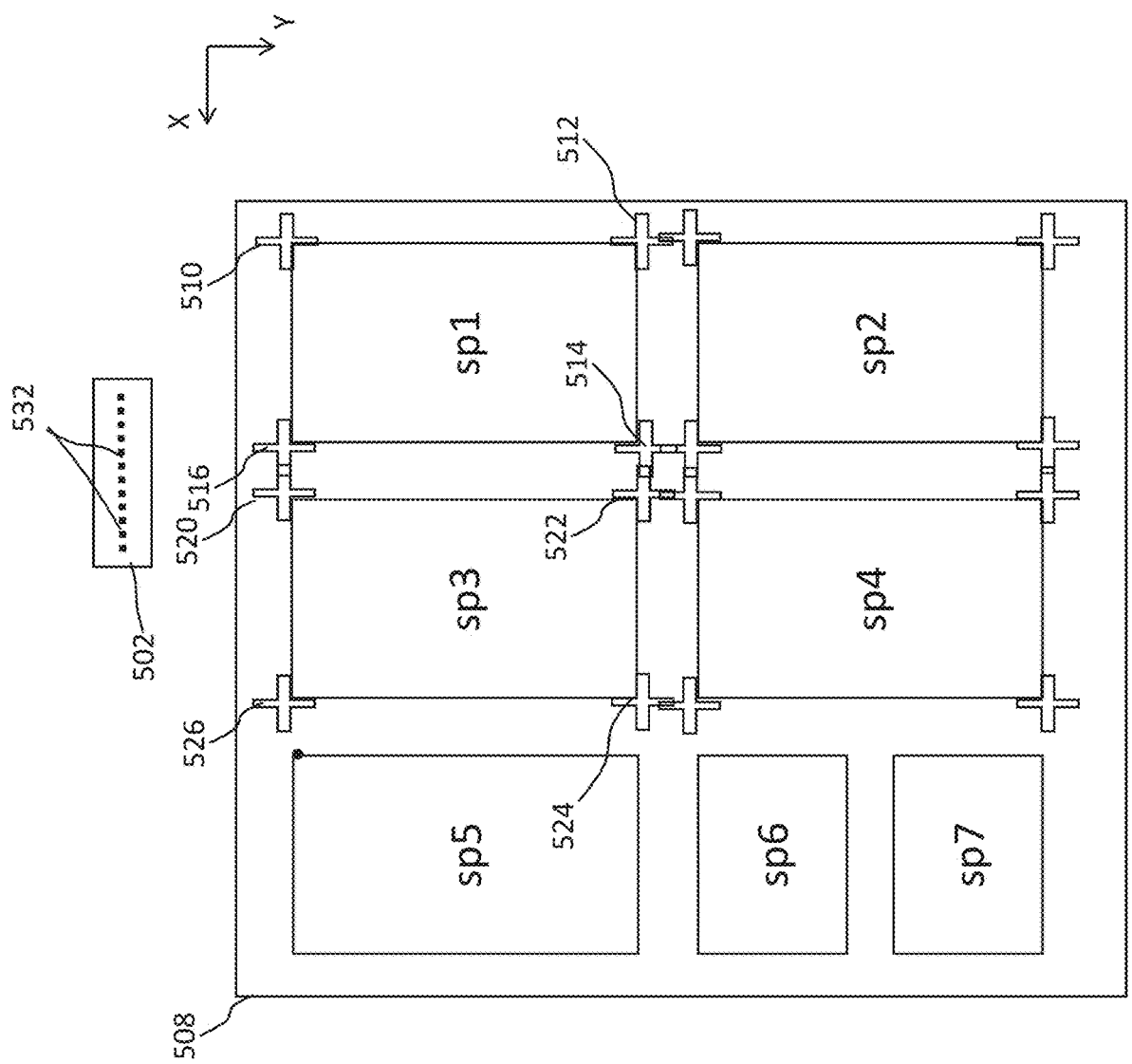
FIG. 5B is a schematic plan view of an imager and a substrate in accordance with one embodiment.

FIG. 5B is a schematic plan view of the imager 502 and the substrate 508 in accordance with one embodiment. FIG. 5B shows a top plan view of the substrate 508 (as seen downward in the ejection direction 225 in FIG. 5A), and a bottom plan view of the imager 502 (as seen upward in the Z direction in FIG. 5A).

The substrate 508 includes at least one print region in which the print material droplets ejected from the dispensing nozzles land to be later processed to form a permanent part of a printed product. In the example configuration in FIG. 5B, the substrate 508 includes seven print regions sp1-sp7, each corresponding, for example, to a display panel to be manufactured. To identify positions of the print regions, the substrate 508 includes for each print region a plurality of substrate marks. In the example configuration in FIG. 5B, each print region include fours substrate marks at its corners. In FIG. 5B, for the sake of simplicity, only substrate marks 510, 512, 514, 516 are indicated for identifying the print region sp1, and substrate marks 520, 522, 524, 526 are indicated for identifying the print region sp3. In one embodiment, the substrate marks are referred to as "fiducial marks" and have one or more known properties such as patterns, orientation, dimensions, and positions on the substrate 508. The substrate marks are attached to (e.g., by adhesive), or etched or machined in, or printed or painted on the substrate 508. Other manners for providing substrate marks to a substrate can be used. The number and/or shapes of the substrate marks in the example configuration in FIG. 5B are examples. Any number and/or shape and/or material and/or orientation of the substrate marks can be used. Any of the substrate marks can include text, bar code, company's name and/or logo. With a higher number of substrate marks and/or more complex mark shapes, the accuracy of the positions of the print regions determined using the substrate marks increases.

To determine the positions of the print region sp1 using the substrate marks 510, 512, 514, 516, the imager 502 is controlled by the controller 118 to capture at least one image of the substrate 508 while the substrate 508 passes, e.g., in the Y direction, under the imager 502. The captured image(s) is/are transmitted from the imager 502, which can be a line scan imager, to the controller 118 which detects at least the substrate marks 510, 512, 514, 516 from the captured image(s). In one example, all substrate marks 510, 512, 514, 516 are captured in a single image. In a further example, the substrate marks 510, 512 are captured in one image, and the other substrate marks 514, 516 are captured in another image. In yet another example, each of the substrate marks 510, 512, 514, 516 is captured in a separate image. Image processing algorithms and/or software and/or programs for recognizing objects based on their known properties such as patterns, positions, sizes and/or orientations are known in the art of image processing, and are not described in detail herein. In one embodiment, the controller 118 relies on such known algorithms and/or software and/or programs for recognizing the further marks 510, 512, 514, 516 from the captured image(s), in a manner similar to how the housing marks 310, 312, 314, 316 are recognized as described with respect to FIGS. 3A-3B.

The controller 118 then maps positions of the print region sp1 as indicated by the detected substrate marks 510, 512, 514, 516 to corresponding positions in the frame of reference of the printing system, in a manner similar to how the determined positions of the dispensing nozzles 206 are mapped to corresponding positions in the frame of reference of the printing system as described with respect to FIGS. 3A-3B. It should be noted that different mapping algorithms can be used to map different marks or different sets of marks. For example, a first algorithm can be used to map the housing marks 310, 312, 314, and 316, while a second algorithm different from the first algorithm can be used to map the substrate marks 510, 512, 514, and 516.

Based on the mapped positions of the dispensing nozzles 206 in the frame of reference of the printing system as described with respect to FIGS. 3A-3B, and the mapped positions of the print region sp1 in the frame of reference of the printing system as described with respect to FIG. 5B, the controller 118 controls ejection of print material from the dispensing nozzles 206 to the print region sp1 of the substrate 508. In one embodiment, this print material ejection control includes physical adjustments of the substrate 508 and/or the printhead assembly 119, and/or logical modification of print data to be used for generation of control signals for the dispensing nozzles 206. Because the mapped positions of the dispensing nozzles 206 and the print region sp1 reflect the actual positions of the dispensing nozzles 206 and the print region sp1 with high accuracy, printing accuracy is improved.

In at least one embodiment, while one print region of the substrate is being printed on, the substrate marks for identifying another print region on the same substrate are imaged and recognized. For example, while the print region sp1 of the substrate 508 is being printed on by a back-and-forth movement of the substrate 508 in the Y direction, the substrate marks 520, 522, 524, 526 for identifying another print region sp3 are imaged during the same back-and-forth movement of the substrate 508 in the Y direction. Accordingly, when the printing operation the print region sp1 is finished, the substrate marks 520, 522, 524, 526 have already been detected and the positions of the corresponding print region sp3 have already been mapped to the frame of reference of the printing system, rendering the print region sp3 immediately ready for its printing operation. As a result, it is possible speed up the printing process of the whole substrate 508 in at least one embodiment.

Figure 6:
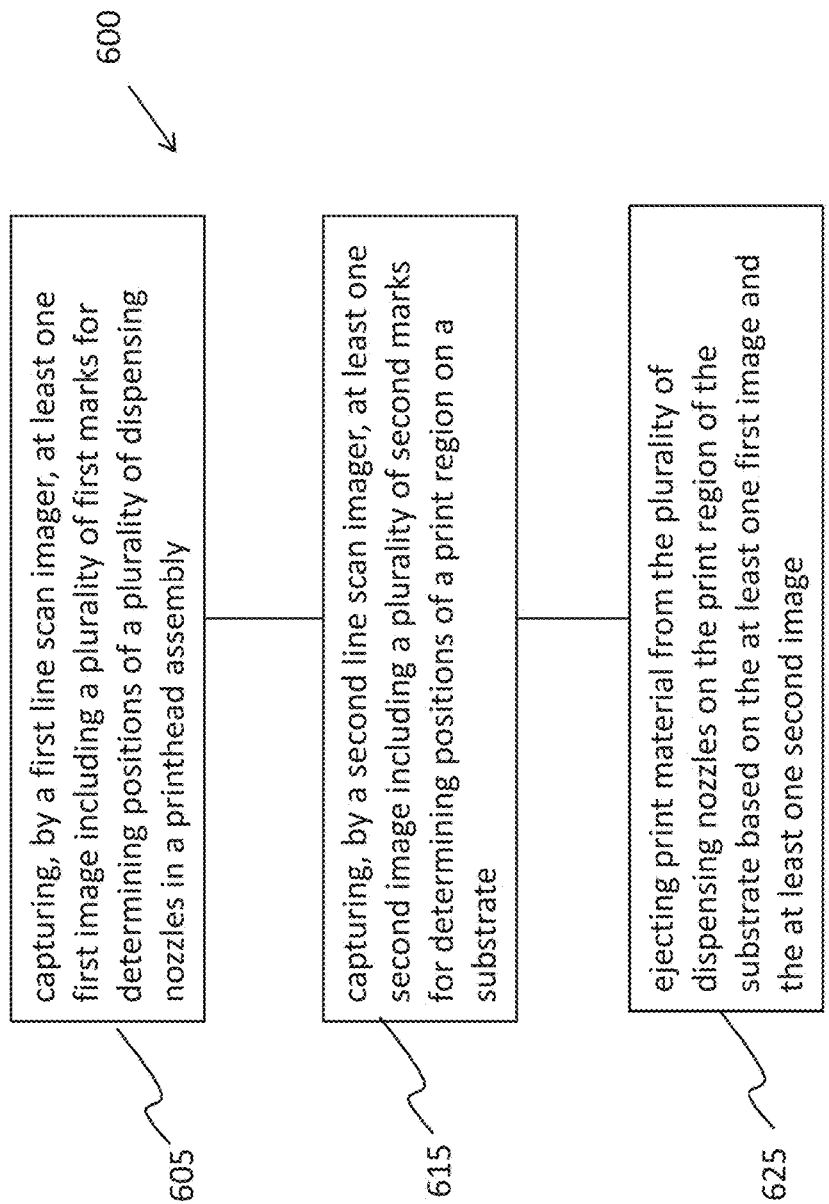
FIG. 6 is a flowchart of a printing method in accordance with one embodiment.

FIG. 6 is a flowchart of a printing method 600 in accordance with one embodiment. In one embodiment, the printing method 600 is performed in the printing system 500 by, or under control of, at least one controller as described herein. In the description below, the printing method 600 is performed by, or under control of, the controller 118.

At operation 605, a controller causes a first imager to capture at least one first image including a plurality of first marks for determining positions of a plurality of dispensing nozzles in a printhead assembly. For example, the controller 118 causes the printhead assembly 119 to move by the line scan imager 202 in the vicinity of the image capturing position as described with respect to FIG. 2B. The controller 118 further causes the line scan imager 202 to capture a first image of the nozzle surface 321 of the printhead assembly 119 during the passing of the printhead assembly 119 in the X direction by the line scan imager 202. The captured first image includes at least a plurality of marks 310, 312, 314, 316 of the printhead assembly 119.

At operation 615, the controller a causes a second imager to capture at least one second image including a plurality of second marks for determining positions of a print region on a substrate. For example, the controller 118 causes the imager 502 to capture at least one second image of the substrate 508 where the substrate marks 510, 512, 514, 516 identifying the print region sp1 (or the substrate marks 520, 522, 524, 526 identifying the print region sp3) are expected, during the passing of the substrate 508 in the Y direction under the imager 502. The passing of the substrate 508 in the Y direction under the imager 502 occurs before the printing operation of the substrate 508 (e.g., for identifying the print region sp1), or during the printing operation of the substrate 508 (e.g., for identifying the print region sp3 while the print region sp1 is being printed).

At operation 625, the controller controls ejection of print material from the plurality of dispensing nozzles to the print region of the substrate based on the at least one first image and the at least one second image. For example, the controller 118 detects or recognizes the plurality of marks 310, 312, 314, 316 from the captured first image of the printhead assembly 119 to determine positions of the dispensing nozzles 206, and detects or recognizes the plurality of substrate marks 510, 512, 514, 516 from the captured second image of the substrate 508 to determine positions of the print region sp1. The controller 118 then maps the determined positions of the dispensing nozzles 206 and the print region sp1 to corresponding positions in the frame of reference of the printing system. The controller 118 then uses the mapped positions of the dispensing nozzles 206 and the print region sp1 in the frame of reference of the printing system to control, when and/or which dispensing nozzles to eject print material in accordance with a recipe which includes printing data or coordinates in the frame of reference of the printing system. As a result, printed products with high printing precision are obtainable.

The described methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

Figure 7:
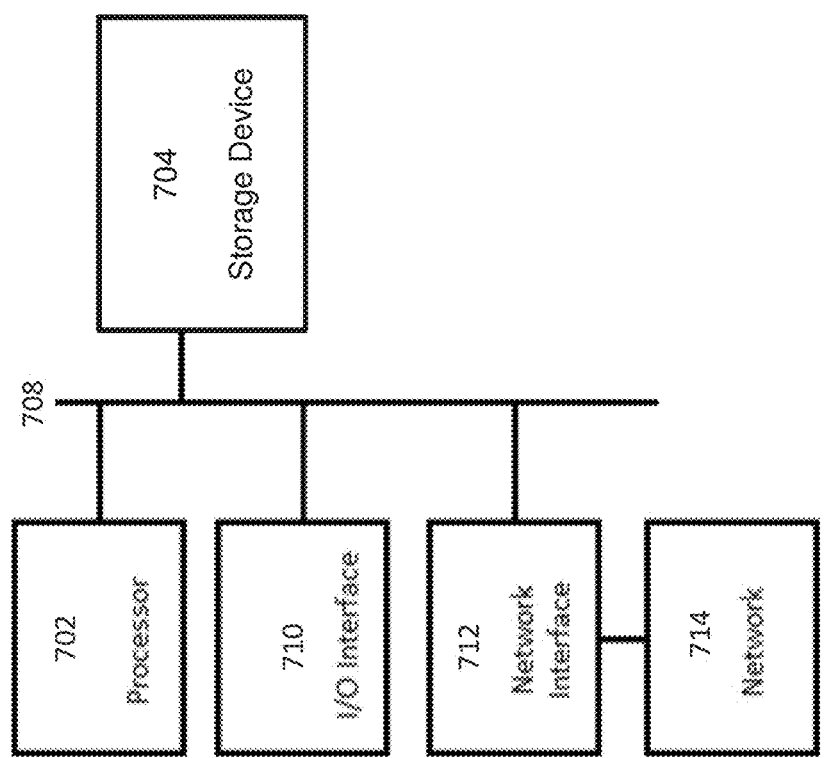
FIG. 7 is a block diagram of a controller, in accordance with one embodiment.

FIG. 7 is a block diagram of a controller, in accordance with one embodiment. One or more of the units and/or systems and/or operations described with respect to FIGS. 1-6 is/are realized in one embodiment by one or more controllers 700 of FIG. 7.

The controller 700 comprises a hardware processor 702, a storage device 704 including at least one non-transitory, computer readable storage medium, a bus 708, an I/O (input/output) interface 710, and a network interface 712. The processor 702 is coupled with the storage device 704, the I/O interface 710, and the network interface 712 via the bus 708. The network interface 712 is connectable to a network 714, so that the processor 702 and the storage device 704 are communicable with other devices via the network 714. The processor 702 is configured to execute computer program instructions encoded in the storage device 704 and/or to access data stored in the storage device 704 to cause the controller 700 to perform one or more functionalities and/or operations described with respect to FIGS. 1-6.

The processor 702 includes one or more of a central processing unit (CPU), a multi-processor, a distributed processing system, an application specific integrated circuit (ASIC), and/or a suitable hardware processing unit.

The storage device 704 includes one or more of an electronic, magnetic, optical, electromagnetic, infrared, and/or a semiconductor system (or apparatus or device) for storing instructions and/or data in a non-transitory manner. For example, the storage device 704 includes a semiconductor or solid-state memory, a magnetic tape, a removable computer diskette, a random access memory (RAM), a read-only memory (ROM), a rigid magnetic disk, and/or an optical disk. As examples of optical disks, storage device 704 includes a compact disk-read only memory (CD-ROM), a compact disk-read/write (CD-R/W), and/or a digital video disc (DVD).

The I/O interface 710 is circuitry that is connectable with external circuitry. For example, the I/O interface 710 includes one or more of a keyboard, keypad, mouse, trackball, trackpad, cursor direction keys, card reader, communication port, display, signal light, printer and/or audio device for communicating information to/from the processor 702. In an example, the I/O interface 710 is omitted.

The network interface 712 is circuitry that allows the controller 700 to communicate with the network 714, to which one or more other controllers and/or image capturing/processing equipment are connected. For example, the network interface 712 includes one or more of wireless network interfaces such as BLUETOOTH, WIFI, WIMAX, GPRS, or WCDMA; or wired network interface such as ETHERNET, USB, or IEEE-1394. In an example, the network interface 712 is omitted.

By being configured to execute some or all of functionalities and/or operations described with respect to FIGS. 1-6, the controller 700 enables the realization of one or more advantages and/or effects described with respect to FIGS. 1-6.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A printing system, comprising:
a substrate support to move a substrate in a scan direction;
a printhead assembly positioned facing the substrate support, the printhead assembly comprising:
a plurality of dispensing nozzles extending in an ejection direction towards the substrate support; and
a plurality of fiducial marks; and
an imager, the printhead assembly and imager being relatively movable, and the imager oriented in a direction opposite to the ejection direction for capturing an image including the plurality of fiducial marks indicating positions of the plurality of dispensing nozzles in the printhead assembly,
wherein
the printhead assembly is movable in a cross-scan direction relative to the imager and the substrate support, and positionable in an imaging field of the imager to enable the imager to capture the image while the printhead assembly is passing by the imager, and
the imager is a line scan imager that has a plurality of image sensors in a linear arrangement along the scan direction transverse to the cross-scan direction.

2. The printing system of claim 1, further comprising:
a controller to
map the positions of the plurality of dispensing nozzles in the printhead assembly to corresponding positions in a frame of reference of the printing system, and control ejection of print material from the plurality of dispensing nozzles based on the mapped positions of the plurality of dispensing nozzles in the frame of reference of the printing system.

3. The printing system of claim 2, wherein
the controller
detects, from the image captured by the imager,
the plurality of fiducial marks, and
a dispensing nozzle of the plurality of dispensing nozzles, and
determines the positions of the plurality of dispensing nozzles in the printhead assembly, based on
the detected plurality of fiducial marks, and
the detected dispensing nozzle.

4. The printing system of claim 1, wherein
the printhead assembly further comprises a plurality of printheads, each printhead having a plurality of printhead marks having predetermined positions relative to the plurality of dispensing nozzles, and
the printing system further comprises a controller to
detect, from the image captured by the imager,
the plurality of fiducial marks, and
the plurality of printhead marks, and
determine the positions of the plurality of dispensing nozzles in the printhead assembly, based on
the detected plurality of fiducial marks,
the detected plurality of printhead marks, and
the predetermined positions of the plurality of printhead marks relative to the plurality of dispensing nozzles.

5. The printing system of claim 1, wherein
the imager is fixed to be stationary relative to the substrate support.

6. The printing system of claim 5, wherein
the plurality of dispensing nozzles are arranged in at least one row along the cross-scan direction.

7. The printing system of claim 6, further comprising:
a controller to control the line scan imager to capture the image to include all of the plurality of dispensing nozzles in a single pass of the printhead assembly in the cross-scan direction by the line scan imager.

8. The printing system of claim 1, wherein
the imager is movable, in a swing motion, relative to the substrate support.

9. A printing method, comprising:
capturing, by an imager, an image of a plurality of marks of a printhead assembly;
detecting the plurality of marks in the image captured by the imager;
determining positions of a plurality of dispensing nozzles in the printhead assembly, based on the detected plurality of marks; and
ejecting print material from the plurality of dispensing nozzles onto a substrate while moving the substrate relative to the printhead assembly, based on the detected positions of the plurality of dispensing nozzles,
wherein
the printhead assembly comprises:
a housing having the plurality of marks, and
a plurality of printheads removably attached to the housing,
each of the plurality of printheads comprises:
a corresponding set of dispensing nozzles among the plurality of dispensing nozzles in the printhead assembly, and
a printhead mark having a predetermined position relative to the corresponding set of dispensing nozzles,
the method further comprises detecting, from the image captured by the imager, the printhead marks of the plurality of printheads, and
said determining the positions of the plurality of dispensing nozzles in the printhead assembly is performed based on
the detected plurality of marks of the housing,
the detected printhead marks of the plurality of printheads, and
the predetermined positions of each of the printhead marks relative to the corresponding set of dispensing nozzles.

10. The printing method of claim 9, further comprising:
mapping the determined positions of the plurality of dispensing nozzles in the printhead assembly to corresponding positions in a frame of reference,
wherein said ejecting print material from the plurality of dispensing nozzles is performed based on the mapped positions of the plurality of dispensing nozzles in the frame of reference.

11. The printing method of claim 9, further comprising:
detecting, from the image captured by the imager, a dispensing nozzle of the plurality of dispensing nozzles,
wherein said determining the positions of the plurality of dispensing nozzles in the printhead assembly is performed based on
the detected plurality of marks, and
the detected dispensing nozzle.

12. The printing method of claim 9, wherein
said capturing the at least one image is performed while the printhead assembly is moved in a cross-scan direction to pass by the imager.

13. The printing method of claim 12, wherein
the imager is a line scan imager that has a plurality of image sensors arranged in a single line along a scan direction transverse to the cross-scan direction,
the plurality of dispensing nozzles is arranged in at least one row along the cross-scan direction, and
the image is captured by the line scan imager in a single pass of the printhead assembly by the line scan imager.

14. A printing system, comprising:
a substrate support;
a printhead assembly positioned facing the substrate support, the printhead assembly comprising:
a printhead having a plurality of dispensing nozzles extending in an ejection direction towards the substrate support;
a housing; and
a plurality of fiducial marks on the housing;
an imager movable relative to the printhead assembly and oriented in a direction opposite to the ejection direction for capturing an image including the plurality of fiducial marks indicating positions of the plurality of dispensing nozzles in the printhead assembly; and
a controller to control ejection of print material from the plurality of dispensing nozzles on the substrate, based on the first image,
wherein
the printhead assembly is movable in a cross-scan direction relative to the imager and the substrate support, and positionable in an imaging field of the imager, and
the imager has a plurality of image sensors arranged along a scan direction transverse to the cross-scan direction to enable the imager to image all of the plurality of dispensing nozzles in a single pass of the printhead assembly in the cross-scan direction across the imaging field of the imager.

15. The printing system of claim 14, wherein the imager is a first imager, the image is a first image, the fiducial marks are first fiducial marks, and the printing system further comprises:
a second imager movable relative to the substrate support and oriented in a direction toward the substrate support for capturing a second image of a substrate on the substrate support,
wherein the controller
detects, from the second image captured by the second imager, a plurality of second fiducial marks indicating a print region of the substrate,
maps positions of the print region as indicated by the detected plurality of second fiducial marks to corresponding positions in a frame of reference of the printing system,
maps the positions of the plurality of dispensing nozzles in the printhead assembly to corresponding positions in the frame of reference of the printing system, and
controls the ejection of print material from the plurality of dispensing nozzles onto a substrate, based on the mapped positions of the plurality of dispensing nozzles and the print region in the frame of reference of the printing system.

16. The printing system of claim 15, wherein
the plurality of image sensors of the first imager are arranged, along the scan direction, over a whole width of an area in which all of the plurality of dispensing nozzles are arranged, and
the substrate support moves a substrate under the second imager, in the scan direction transverse to the cross-scan direction, to enable the second imager to capture the second image while the substrate is passing under the second imager.

17. The printing system of claim 14, wherein the controller
detects, from the image captured by the imager,
the plurality of fiducial marks, and
a dispensing nozzle of the plurality of dispensing nozzles, and
determines the positions of the plurality of dispensing nozzles in the printhead assembly, based on
the detected plurality of fiducial marks, and
the detected dispensing nozzle.

18. The printing system of claim 14, wherein the fiducial marks are first fiducial marks, and
the printhead assembly further comprises a plurality of third fiducial marks having predetermined positions relative to the plurality of dispensing nozzles, and
the controller
detects, from the image captured by the imager,
the plurality of first fiducial marks, and
the plurality of third fiducial marks, and
determines the positions of the plurality of dispensing nozzles in the printhead assembly, based on
the detected plurality of first fiducial marks,
the detected plurality of third fiducial marks, and
the predetermined positions of the plurality of third fiducial marks relative to the plurality of dispensing nozzles.

19. The printing system of claim 14, wherein
the imager is fixed to be stationary relative to the substrate support.

20. The printing system of claim 14, wherein the imager is movable, in a swing motion, relative to the substrate support.

* * * * *